(12) United States Patent
Ogura et al.

(10) Patent No.: US 7,948,540 B2
(45) Date of Patent: May 24, 2011

(54) PHOTOELECTRIC CONVERSION DEVICE WITH ISOLATION SWITCHES ARRANGED BETWEEN SIGNAL LINES AND AMPLIFIERS

(75) Inventors: Masanori Ogura, Atsugi (JP); Toru Koizumi, Yokohama (JP); Masaru Fujimura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 11/850,266

(22) Filed: Sep. 5, 2007

(65) Prior Publication Data

US 2008/0062296 A1    Mar. 13, 2008

(30) Foreign Application Priority Data

Sep. 7, 2006   (JP) ................................. 2006-243395

(51) Int. Cl.
*H04N 3/14* (2006.01)
*H04N 5/335* (2011.01)

(52) U.S. Cl. ........................................ 348/300; 348/308

(58) Field of Classification Search .................. 348/300, 348/301, 302, 308
See application file for complete search history.

(56) References Cited

U.S. PATENT DOCUMENTS

| | | | |
|---|---|---|---|
| 6,320,616 B1 * | 11/2001 | Sauer | 348/241 |
| 6,670,990 B1 | 12/2003 | Kochi et al. | 348/310 |
| 6,747,264 B2 | 6/2004 | Miida | |
| 6,795,121 B2 * | 9/2004 | Matsunaga et al. | 348/308 |
| 6,801,256 B1 * | 10/2004 | Egawa et al. | 348/294 |
| 6,903,670 B1 * | 6/2005 | Lee et al. | 341/118 |
| 6,960,751 B2 | 11/2005 | Hiyama et al. | 250/208.1 |
| 7,053,662 B1 * | 5/2006 | Silver et al. | 326/113 |
| 7,081,922 B2 * | 7/2006 | Mentzer | 348/230.1 |
| 7,110,030 B1 | 9/2006 | Kochi et al. | 348/308 |
| 7,227,208 B2 | 6/2007 | Ogura et al. | 257/292 |
| 7,321,110 B2 | 1/2008 | Okita et al. | 250/208.1 |
| 7,324,144 B1 | 1/2008 | Koizumi | 348/294 |
| 7,595,827 B2 * | 9/2009 | Sato | 348/296 |
| 7,623,169 B2 * | 11/2009 | Apte | 348/294 |
| 2003/0164887 A1 | 9/2003 | Koizumi et al. | 348/308 |
| 2004/0080637 A1 * | 4/2004 | Nakamura et al. | 348/255 |
| 2004/0195491 A1 * | 10/2004 | Machida | 250/208.1 |
| 2005/0168602 A1 * | 8/2005 | Sumi et al. | 348/294 |
| 2005/0259167 A1 | 11/2005 | Inoue et al. | |
| 2006/0043393 A1 | 3/2006 | Okita et al. | 257/93 |
| 2006/0043439 A1 | 3/2006 | Koizumi | 257/291 |
| 2006/0043440 A1 | 3/2006 | Hiyama et al. | 257/291 |

(Continued)

FOREIGN PATENT DOCUMENTS

JP    2002-320146 A    10/2002

(Continued)

*Primary Examiner* — John M Villecco
(74) *Attorney, Agent, or Firm* — Fitzpatrick, Cella, Harper & Scinto (57) ABSTRACT

A photoelectric conversion device prevents a pseudo signal caused by the parasitic capacitance of a transfer switch from being input to an amplifier. A photoelectric conversion device (50) includes a pixel (10) which outputs a signal to a signal line (107), an amplifier which amplifies the signal supplied via the signal line (107), and an isolation switch (121) inserted between a signal line (108) and the input node of the amplifier. The pixel (10) includes a photodiode, a floating diffusion (FD), a transfer switch which transfers the charge of the photodiode to the FD, and an amplification transistor which outputs a signal to a signal line (109) in accordance with the potential of the FD. The isolation switch (121) is turned off at least in a period when a transfer pulse for controlling the transfer switch of the pixel (10) transits.

10 Claims, 13 Drawing Sheets

U.S. PATENT DOCUMENTS

| | | | |
|---|---|---|---|
| 2006/0044434 A1 | 3/2006 | Okita et al. | 348/294 |
| 2006/0044439 A1 | 3/2006 | Hiyama et al. | 348/308 |
| 2006/0102827 A1* | 5/2006 | Kasuga et al. | 250/208.1 |
| 2006/0157759 A1 | 7/2006 | Okita et al. | 257/292 |
| 2006/0158539 A1 | 7/2006 | Koizumi et al. | 348/300 |
| 2006/0158543 A1 | 7/2006 | Ueno et al. | 348/308 |
| 2006/0208291 A1 | 9/2006 | Koizumi et al. | 257/292 |
| 2006/0208292 A1 | 9/2006 | Itano et al. | 257/292 |
| 2006/0221667 A1 | 10/2006 | Ogura et al. | 365/149 |
| 2007/0146516 A1 | 6/2007 | Nezaki et al. | 348/301 |

FOREIGN PATENT DOCUMENTS

| | | |
|---|---|---|
| JP | 2005-311487 A | 11/2005 |
| JP | 2005-333462 A | 12/2005 |
| WO | WO 2005069608 A1 * | 7/2005 |

\* cited by examiner

PRIOR ART

PRIOR ART

PHOTOELECTRIC CONVERSION DEVICE WITH ISOLATION SWITCHES ARRANGED BETWEEN SIGNAL LINES AND AMPLIFIERS

BACKGROUND OF THE INVENTION

1. Field of the Invention

The present invention relates to a photoelectric conversion device and an imaging device including it.

2. Description of the Related Art

Figure 7:
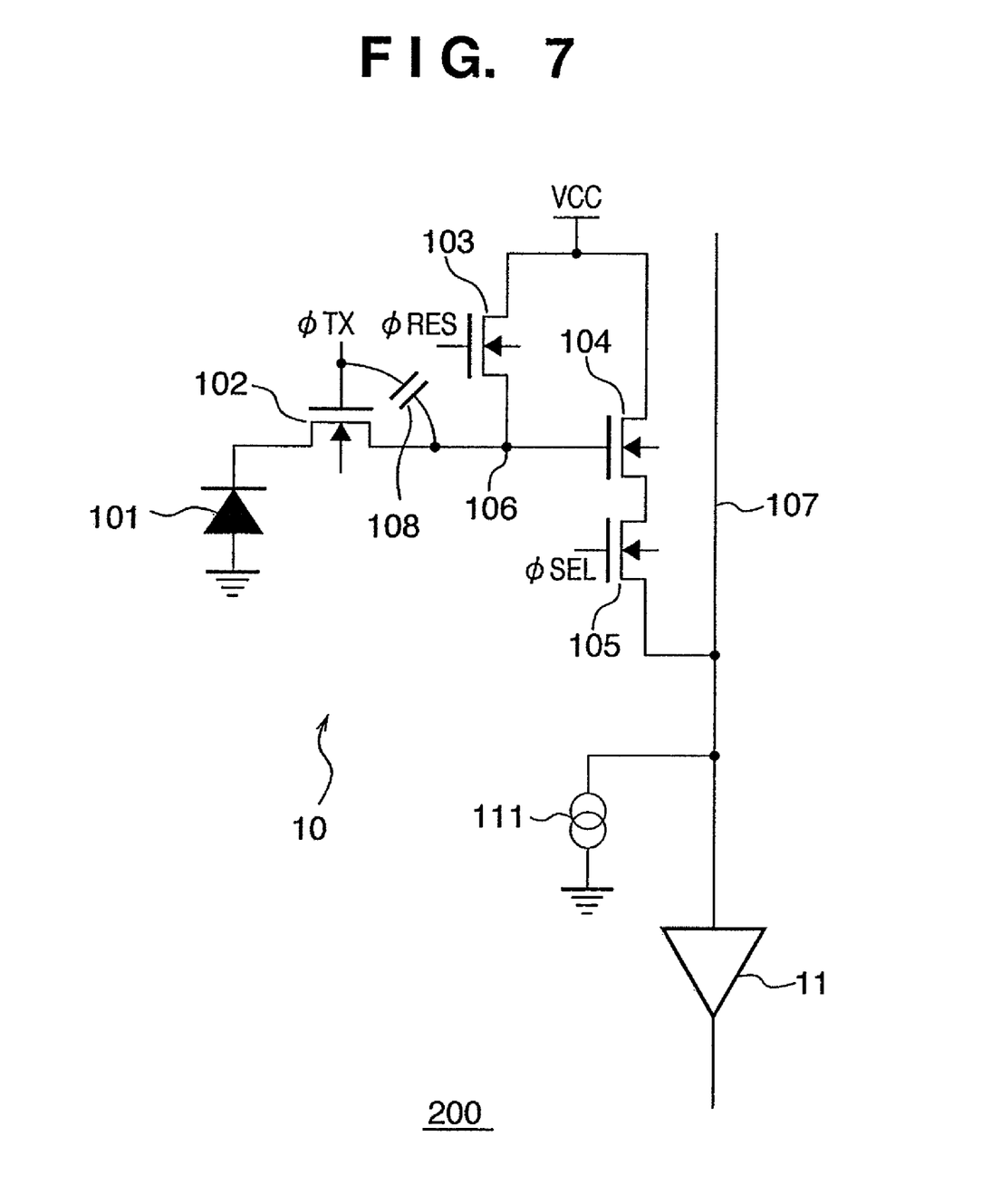
FIG. 7 is a circuit diagram schematically showing the arrangement of a photoelectric conversion device.

FIG. 7 is a circuit diagram schematically showing the arrangement of a photoelectric conversion device. A photoelectric conversion device 200 shown in FIG. 7 includes a pixel 10 which outputs a signal to a vertical signal line 107, and an amplifier 11 which amplifies a signal supplied via the vertical signal line 107.

The pixel 10 includes a photodiode 101, transfer switch 102, reset switch 103, amplification transistor 104, and row selecting transistor 105. The transfer switch 102 transfers a charge generated by the photodiode 101 to a floating diffusion (FD) 106 when a transfer pulse φTX is enabled. The amplification transistor 104 constitutes a source-follower circuit with a constant current load 111 connected to the vertical signal line 107, and outputs a signal to the vertical signal line 107 in accordance with the potential of the FD 106. The reset transistor 103 resets the FD 106 and the photodiode 101 when a reset pulse φRES is enabled. The row selecting transistor 105 connects the source of the amplification transistor 104 to the vertical signal line 107 when a row selecting signal φSEL is enabled. That is, when the row selecting transistor 105 connected to the amplification transistor 104 is activated, that is, when the row to which the pixel 10 belongs is selected, the amplification transistor 104 outputs a signal to the vertical signal line 107.

Figure 5:
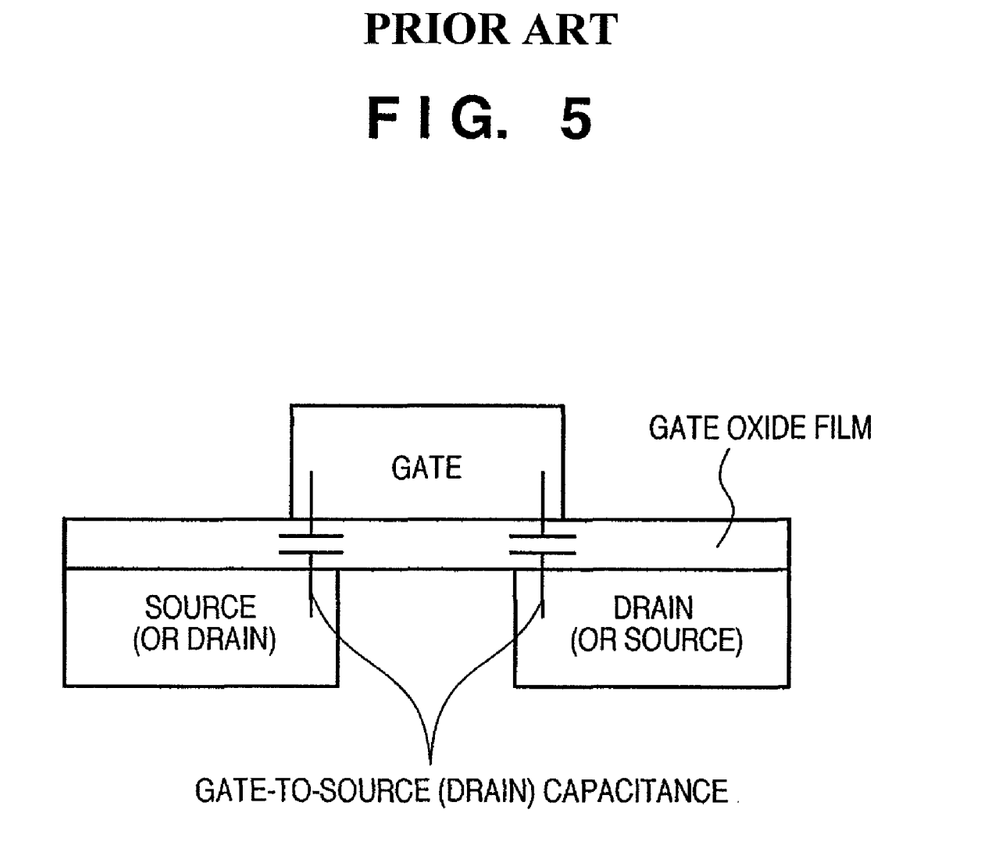
FIG. 5 is a view schematically showing the structure of a MOS transistor.

FIG. 5 is a view schematically showing the structure of a MOS transistor. A parasitic capacitance (overlap capacitance) is formed between a gate and a diffusion region (source or drain) via a gate oxide film. This parasitic capacitance causes capacitive coupling between the gate and the diffusion region (source or drain) to transmit the potential fluctuation of the gate to the diffusion region at a predetermined ratio. The transmission ratio depends on the size of the parasitic capacitance. The parasitic capacitance can be controlled in accordance with a device structure. For example, the parasitic capacitance is several tens of aF to several fF per unit gate width.

The transfer switch 102 comprises a MOS transistor, and includes a parasitic capacitance 108. When the transfer pulse φTX is enabled to high level, the parasitic capacitance 108 fluctuates the potential of the FD 106. Hence, the potential of the vertical signal line 107 fluctuates by a value obtained by multiplying the potential fluctuation of the FD 106 by the gain of the source-follower circuit including the amplification transistor 104 and the constant current load 111. As a result, the output from the amplifier 11 falls outside a normal operation range. This phenomenon is called a range over. After that, it takes a long time before the output from the amplifier 11 returns to the normal operation range, thus prolonging a readout time. As a result, for example, the number of frames to be photographed per second decreases in a digital still camera, the frame rate decreases in a video camera, and an image capturing time becomes long in an image scanner image input device. Even if the gain of the amplifier 11 is low and the range over does not occur, a pseudo signal fluctuates the output from the amplifier 11, thus prolonging the readout time.

SUMMARY OF THE INVENTION

The present invention has been made to overcome the conventional drawbacks, and has as its object to prevent a pseudo signal such as one caused by the parasitic capacitance of a transfer switch from being input to an amplifier.

A photoelectric conversion device according to the present invention relates to a photoelectric conversion device including a pixel which outputs a signal to a signal line, and an amplifier which amplifies the signal supplied via the signal line. The photoelectric conversion device includes an isolation switch inserted between the signal line and an input node of the amplifier. The pixel includes a photodiode, a floating diffusion, a transfer switch which transfers a charge of the photodiode to the floating diffusion, and an amplification transistor which outputs a signal to the signal line in accordance with a potential of the floating diffusion. The isolation switch is turned off at least in a period when a transfer pulse for controlling the transfer switch transits.

The present invention can prevent a pseudo signal caused by the parasitic capacitance of a transfer switch from being input to an amplifier.

Further features of the present invention will become apparent from the following description of exemplary embodiments with reference to the attached drawings.

DESCRIPTION OF THE EMBODIMENTS

Preferred embodiments of the present invention will now be described in accordance with the accompanying drawings.

First Embodiment

Figure 1A:
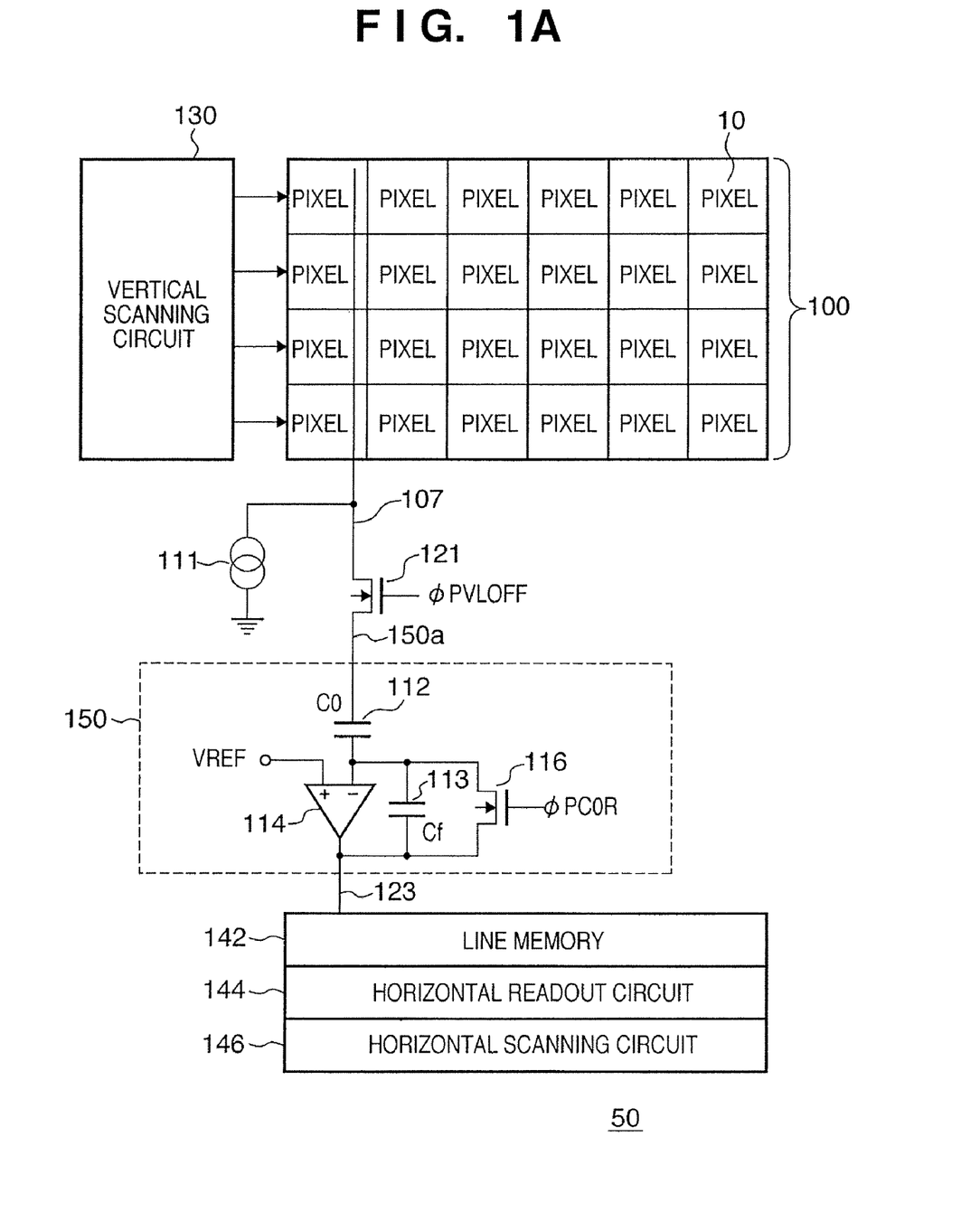
FIG. 1A is a diagram schematically showing the arrangement of a photoelectric conversion device (solid-state image sensing device) according to the first embodiment of the present invention.
Figure 6:
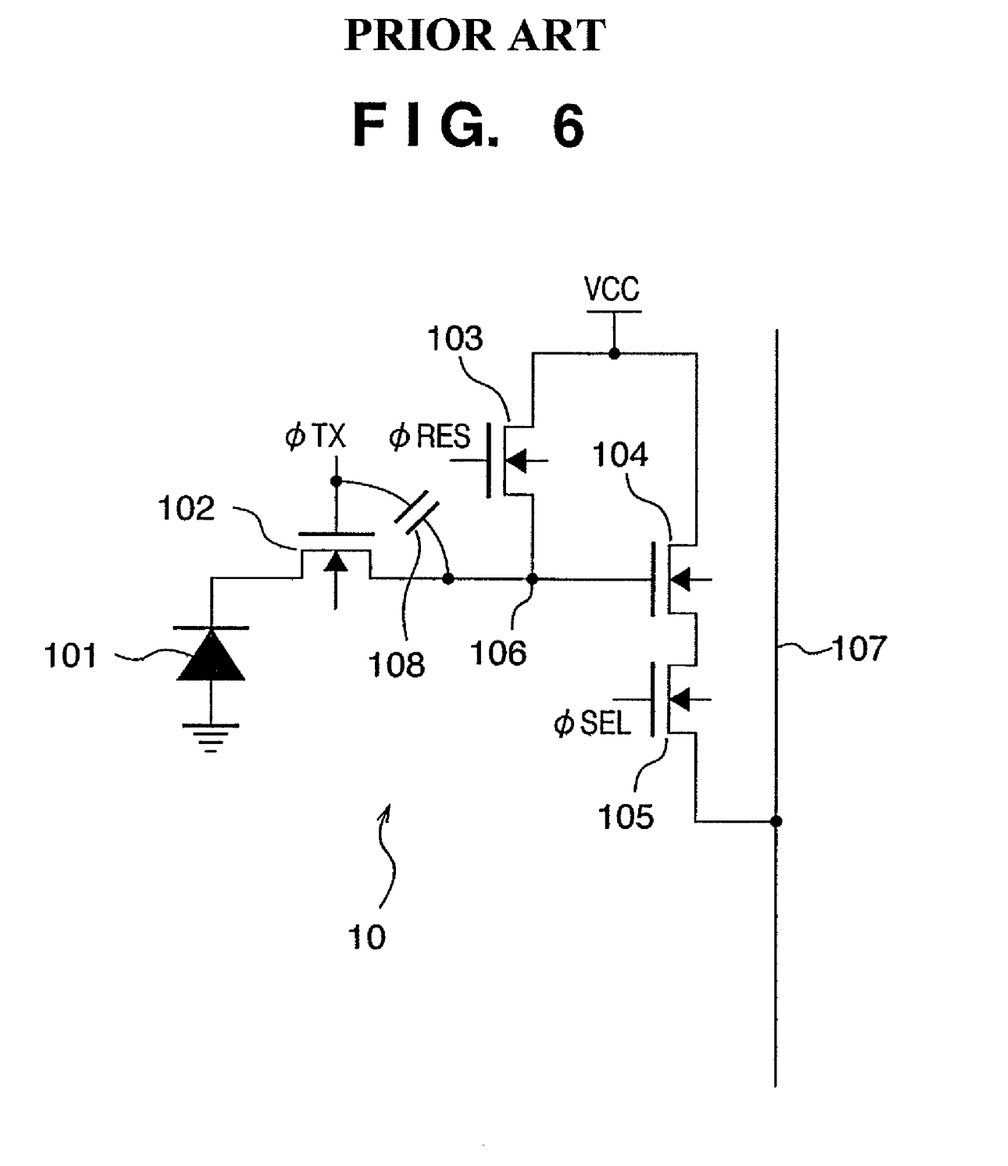
FIG. 6 is a circuit diagram showing the arrangement of a pixel.

FIG. 1A is a diagram schematically showing the arrangement of a photoelectric conversion device (solid-state image sensing device) according to the first embodiment of the present invention. A photoelectric conversion device 50 shown in FIG. 1A includes a pixel array 100 in which pixels 10 each shown in FIG. 6 are arrayed in a matrix. A vertical scanning circuit 130 sequentially selects (scans) a plurality of rows which form the pixel array 100. The pixel 10 which belongs to the selected row outputs a signal to a vertical signal line 107 corresponding to the column to which the pixel 10 belongs. FIG. 1A shows only one vertical signal line 107 for the sake of simplicity.

The pixel 10 shown in FIG. 6 includes a photodiode 101, transfer switch (MOS transistor) 102, reset switch 103, amplification transistor 104, and row selecting transistor 105. The transfer switch 102 transfers a charge generated by the photodiode 101 to a floating diffusion (FD) 106 when a transfer pulse φTX is enabled. The amplification transistor 104 constitutes a source-follower circuit with a constant current load 111 connected to the vertical signal line 107, and outputs a signal to the vertical signal line 107 in accordance with the potential of the FD 106. The reset switch 103 resets the FD 106 and the photodiode 101 when a reset pulse φRES is enabled. The row selecting transistor 105 connects the source of the amplification transistor 104 to the vertical signal line 107 when the vertical scanning circuit 130 enables a row selecting signal φSEL. That is, when the row selecting transistor 105 connected to the amplification transistor 104 is activated, that is, when selecting the row to which the pixel 10 belongs, the amplification transistor 104 outputs a signal to the vertical signal line 107.

The vertical signal line 107 connects to an input node 150a of an amplifier 150 via an isolation switch 121. For example, the isolation switch 121 can comprise an NMOS transistor.

The amplifier 150 includes a differential amplifier 114, clamp capacitor (CO) 112, feedback capacitance 113, and reset switch 116. The clamp capacitor 112 connects in series between the first input terminal (inverting input terminal) of the differential amplifier 114 and the input node 150a. The feedback capacitance 113 connects between the output terminal and first input terminal of the differential amplifier 114. The reset switch 116 connects in parallel with the feedback capacitance (Cf) 113, that is, connects between the output terminal and first input terminal of the differential amplifier 114. The second input terminal (noninverting input terminal) of the differential amplifier 114 receives a reference voltage VREF. The amplifier 150 with such arrangement is a clamp-type amplifier.

A line memory 142 stores a signal output from the amplifier 150 for each column. A horizontal readout circuit 144 controlled by a horizontal scanning circuit 146 sequentially reads out signals from the line memory 142 for each column.

Figure 1B:
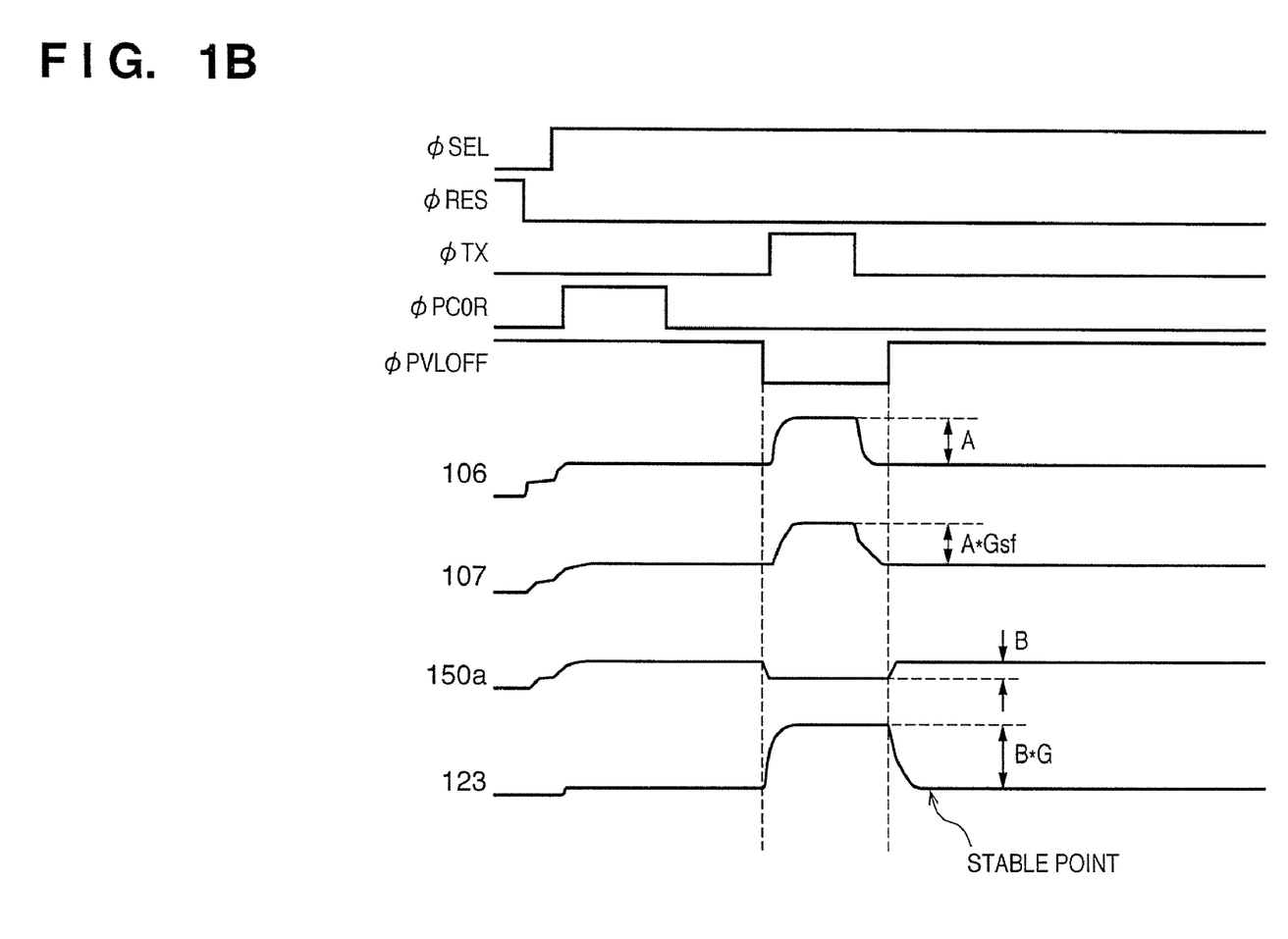
FIG. 1B is a timing chart exemplifying the signal readout operation of a photoelectric conversion device 50 shown in FIG. 1A.

FIG. 1B is a timing chart exemplifying the signal readout operation of the photoelectric conversion device 50 shown in FIG. 1A. When a reset pulse φPCOR is enabled to high level, the two ends of the feedback capacitance (Cf) 113 are short-circuited, and the clamp capacitor (CO) 112 holds the potential (reset level) of the vertical signal line 107 with respect to the reference voltage VREF. In this case, the output from the differential amplifier 114 is at the offset level of the differential amplifier 114, and this output is referred to as an N level signal. An N-level holding memory (to be referred to as an N memory hereinafter) in the line memory 142 holds this N level.

When the transfer pulse φTX is enabled to high level after the reset pulse φPCOR is disabled to low level, the charge stored in the photodiode 101 during a light-storage period is transferred to the FD 106. The potential of the FD 106 then fluctuates, and the source-follower circuit including the amplification transistor 104 and the constant current load 111 amplifies the fluctuation amount, and outputs it to the vertical signal line 107. The difference between an optical signal level and the reset level appears on the vertical signal line 107. An output node 123 of the amplifier 150 outputs the level (to be referred to as an (S+N) level hereinafter) obtained by superposing the N level on the signal which is obtained by multiplying the difference by the gain G(=CO/Cf) of the amplifier 150. An (S+N) level holding memory (to be referred to as an (S+N) memory hereinafter) in the line memory 142 holds the (S+N) level. The horizontal readout circuit 144 sequentially outputs, for each column, the differences between the (S+N) level in the (S+N) memory and the N level in the N memory, that is, S levels (pixel signals).

When the transfer pulse φTX is enabled to high level, a parasitic capacitance 108 fluctuates the potential of the FD 106 by "A". When the gain of the source-follower circuit including the amplification transistor 104 and the constant current load 111 is Gsf, the potential fluctuation of the FD 106 fluctuates the potential of the vertical signal line 107 by A×Gsf.

Figure 8:
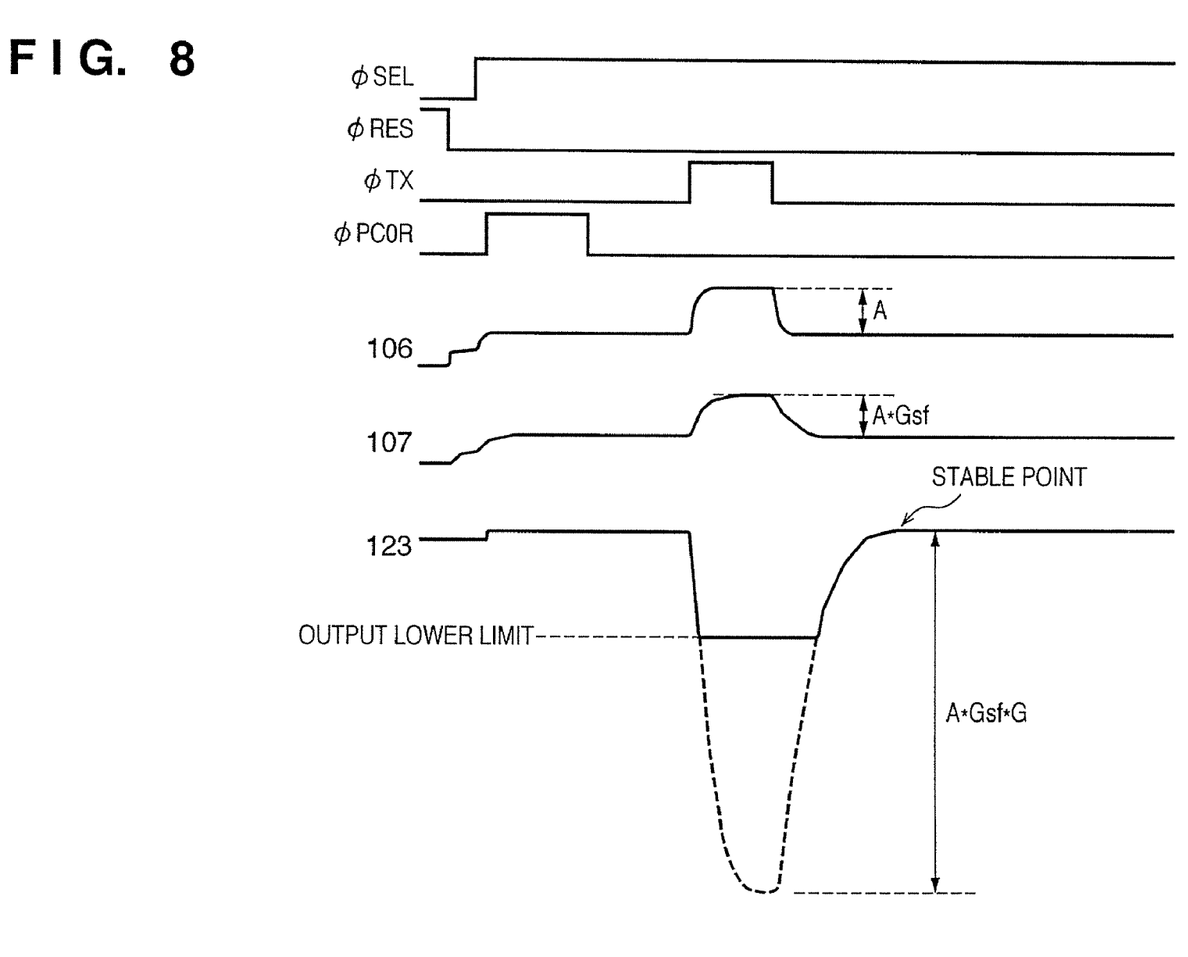
FIG. 8 is a timing chart exemplifying the operation of the photoelectric conversion device which has no isolation switch.

Accordingly, when the photoelectric conversion device has no isolation switch 121, the input level of the amplifier 150 fluctuates by A×Gsf. Hence, when the gain of the amplifier 150 is G(=CO/Cf), the output from the amplifier 150 fluctuates by A×Gsf×G. If A=400 mV, Gsf=0.9, and G(=CO/Cf) =20, the potential fluctuation at the output node 123 of the amplifier 150 is A*Gsf*G(CO/Cf)=7.2 V. As exemplified by FIG. 8, the output from the amplifier 150 remains at the lower limit. This phenomenon is the above-described range over. When the range over occurs, the amplifier 150 switches to a deep OFF state, and it takes a long time before the output returns to the normal output range (stable point). Referring to FIG. 8, the waveform indicated by a broken line is a virtual line, and the actual output does not drop below the output lower limit.

When reading is completed before the stable point in order to shorten the readout time, an image which is darker than a normal original image is output.

Figure 9:
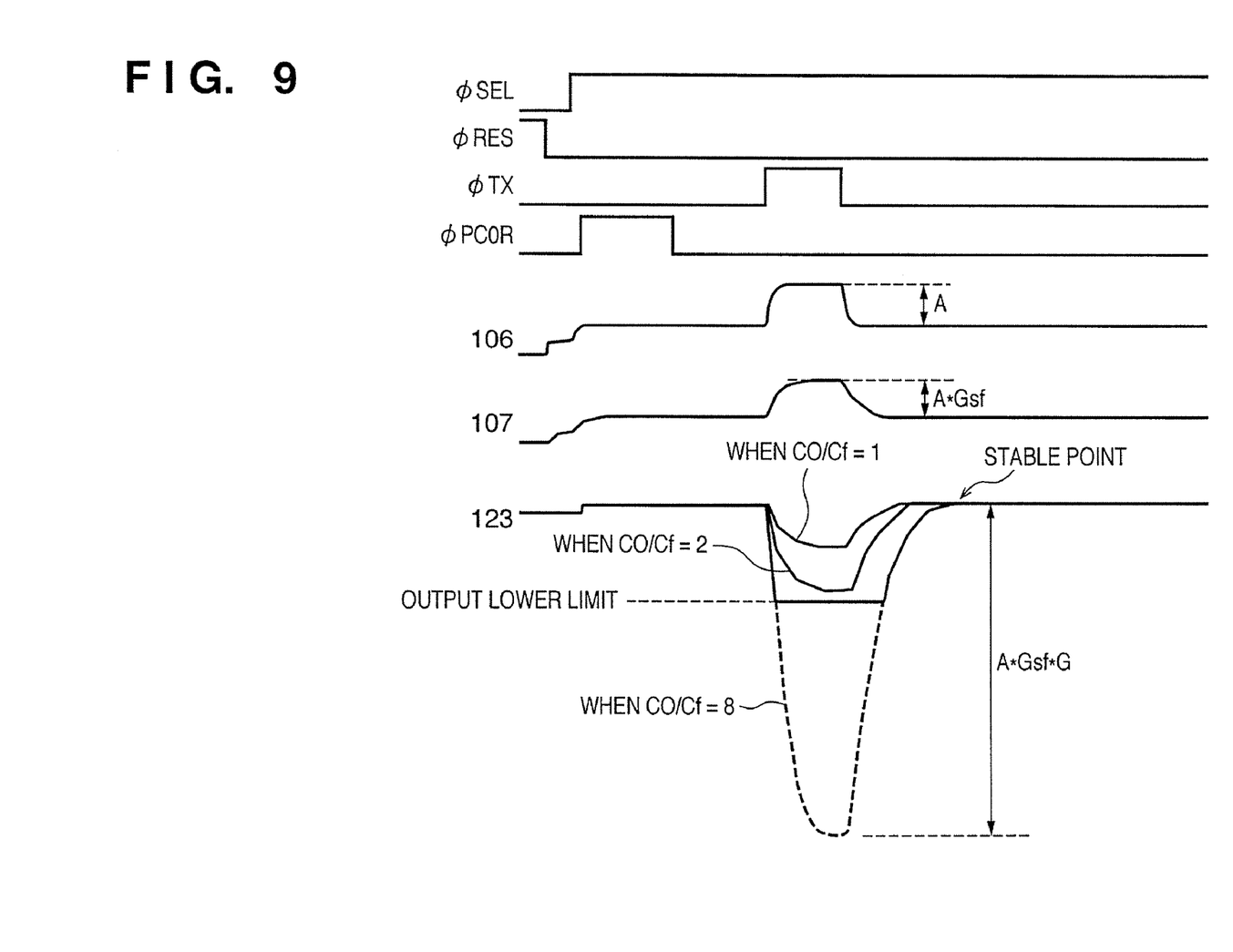
FIG. 9 is a timing chart exemplifying the operation of the photoelectric conversion device which has no isolation switch.

FIG. 9 shows the output node 123 of the amplifier 150 upon changing the gain G(=CO/Cf) of the amplifier 150 when the photoelectric conversion device has no isolation switch 121. As is apparent from FIG. 9, as the gain of the amplifier 150 becomes higher, the output signal becomes closer to or remains at the lower limit, and this delays a return to the stable point. Note that the waveform indicated by the broken line is a virtual line, and the actual output does not drop below the lower limit. In an amplifier (AMP), a product GB of the gain G and the operation frequency bandwidth B is generally constant. Hence, as the gain G increases, the operation frequency, that is, response speed decreases. Accordingly, it takes a longer time before the output returns from the range over in a high-gain state to the normal operation range. Even if the range over does not occur for the output from the amplifier 150 without such high gain setting, the increase in readout speed is disabled when a pseudo signal such as A×Gsf which is not the original pixel signal is input.

On the other hand, in this embodiment, the isolation switch 121 is inserted between the vertical signal line 107 and the input node 150a of the amplifier 150 to suppress the potential fluctuation of the input node 150a of the amplifier 150 due to transition of the transfer pulse φTX. More specifically, at least in the period when the transfer pulse φTX for controlling the transfer switch 102 transits, the isolation switch 121 disconnects the vertical signal line 107 from the input node 150a of the amplifier 150. The isolation switch 121 is controlled by an isolation signal φPVLOFF supplied to the gate. The isolation signal φPVLOFF is enabled to low level before the transfer pulse φTX is enabled, and is disabled to high level after the transfer pulse φTX is disabled, more preferably, after the potential of the vertical signal line 107 becomes stable. The isolation switch 121 is turned off when the isolation signal φPVLOFF is enabled to low level, and turned on when the isolation signal φPVLOFF is disabled to high level. A control block (not shown) such as the control block which generates the reset pulse φPCOR can generate the isolation signal φPVLOFF.

With such arrangement and control, the amplifier 150 does not receive a pseudo signal A×Gsf on the vertical signal line 107.

Note that when the isolation signal φPVLOFF to be supplied to the gate of the isolation switch 121 transits, a small pseudo signal appears at the input node 150a of the amplifier 150 because of capacitive coupling due to the parasitic capacitance between the gate and diffusion region of the isolation switch 121. FIG. 1B shows this level as "B". Because of this pseudo signal, the output fluctuates by B×G at the output node 123 of the amplifier 150.

According to this embodiment, the output from the amplifier 150 does not fall outside the normal operation range, thus shortening the time before the output returns to the state in which the amplifier 150 outputs the original signal (stable point). Accordingly, the readout time can be shortened, and the time required until the potential of the vertical signal line 107 returns from the pseudo signal level can also be shortened. This is because the clamp capacitor 112 cannot be seen from the vertical signal line 107 upon turning off the isolation switch 121. Hence, the isolation signal φPVLOFF can smoothly be disabled to high level after the transfer pulse φTX is disabled.

The isolation switch 121 can be effectively arranged not only when the gain of the amplifier 150 is high but also when the gain of the amplifier 150 is low. That is, the isolation switch 121 suppresses the output fluctuation of the amplifier 150 due to the pseudo signal, thus shortening the readout time.

As a result, for example, the number of frames to be photographed per second can increase in a digital still camera, the frame rate can increase in a video camera, and an image sensing time can be shortened in an image scanner image input device. Additionally, an image quality can be improved when performing reading operation at the conventional timing.

Second Embodiment

Figure 2A:
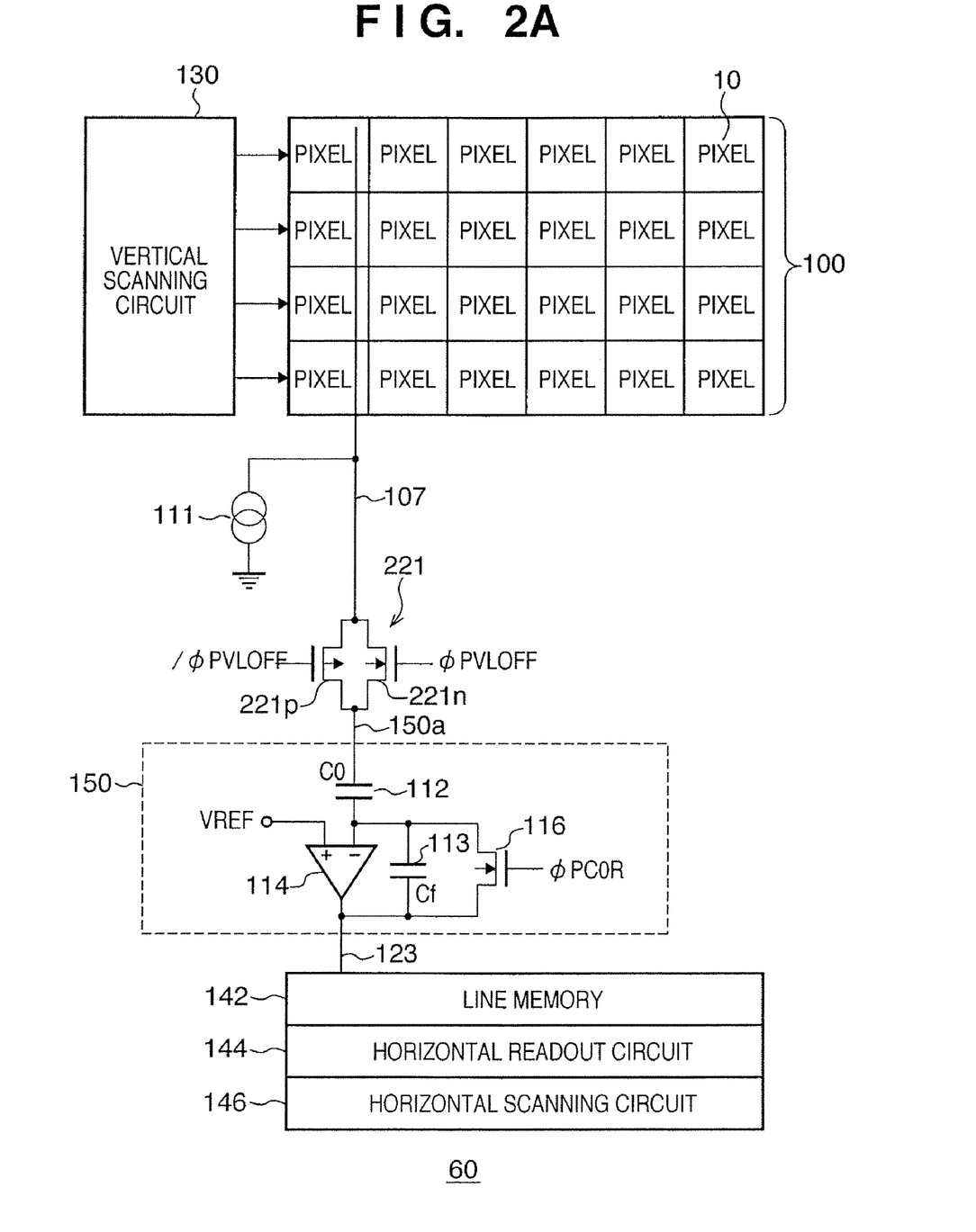
FIG. 2A is a diagram schematically showing the arrangement of a photoelectric conversion device (solid-state image sensing device) according to the second embodiment of the present invention.

FIG. 2A is a diagram schematically showing the arrangement of a photoelectric conversion device (solid-state image sensing device) according to the second embodiment of the present invention. Details which are not particularly referred to here can follow the first embodiment.

A photoelectric conversion device 60 in this embodiment has the arrangement in which an isolation switch 121 in the first embodiment is replaced with an isolation switch 221. The isolation switch 221 is a parallel circuit of an NMOS transistor 221n and a PMOS transistor 221p having the same size. The gate of the NMOS transistor 221n receives an isolation signal φPVLOFF which is the same as that in the first embodiment, and the gate of the PMOS transistor 221p receives an inverted isolation signal /φPVLOFF serving as the inverted signal of the isolation signal φPVLOFF. With such arrangement, the isolation signal φPVLOFF and the inverted isolation signal /φPVLOFF having the opposite logical levels can cancel the potential fluctuation of an input node 150a caused by the parasitic capacitance between the gate and diffusion region of the MOS transistor included in the switch 221.

Figure 2B:
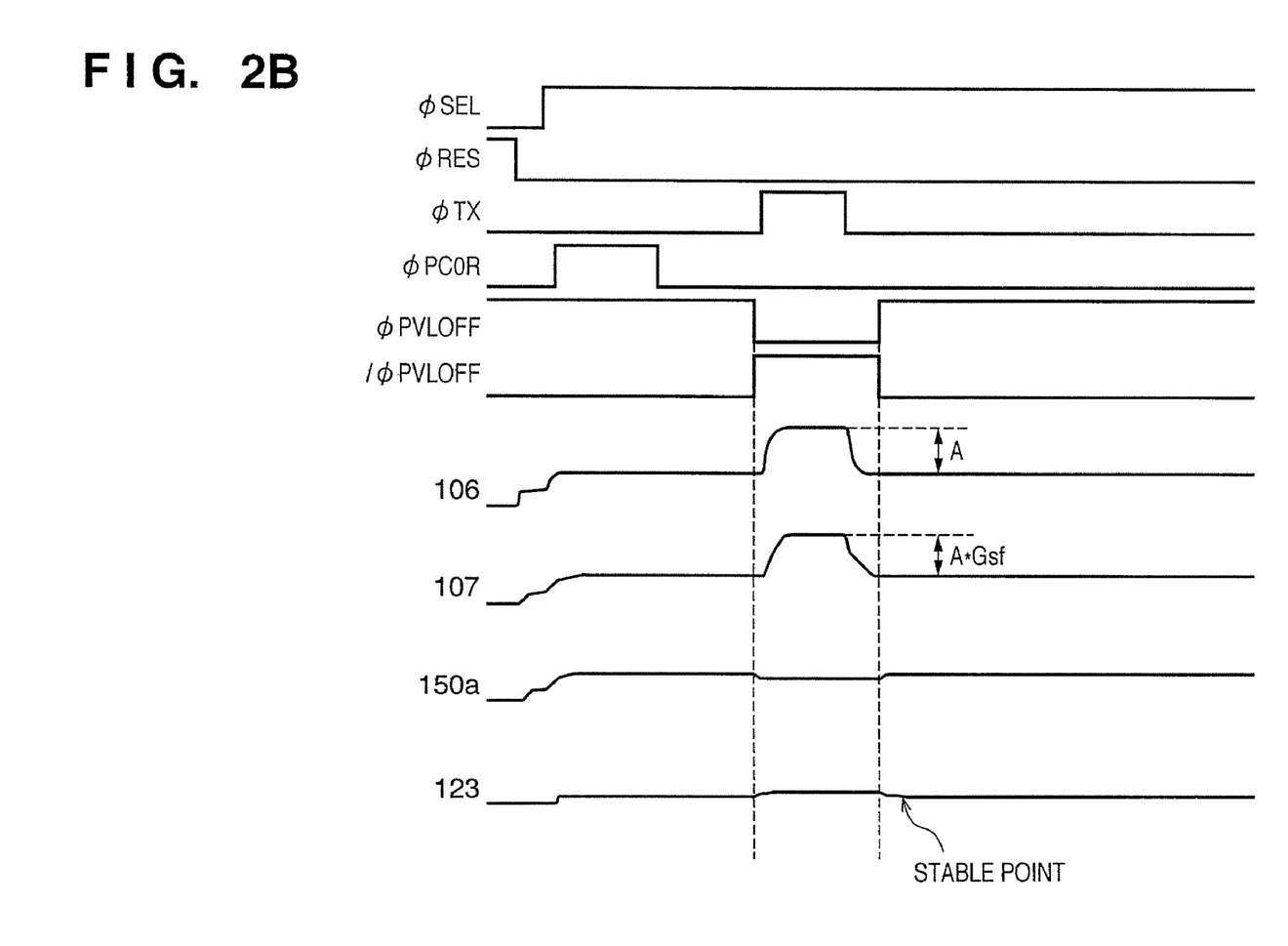
FIG. 2B is a timing chart showing the operation example of a photoelectric conversion device (solid-state image sensing device) according to the second embodiment of the present invention.

As exemplified by FIG. 2B, a high cancellation effect is obtained, and there is almost no potential fluctuation of the input node 150a due to capacitive coupling between the isolation signal φPVLOFF and the inverted isolation signal /φPVLOFF. Accordingly, the readout time can be shorter than that in the first embodiment.

Third Embodiment

Figure 3A:
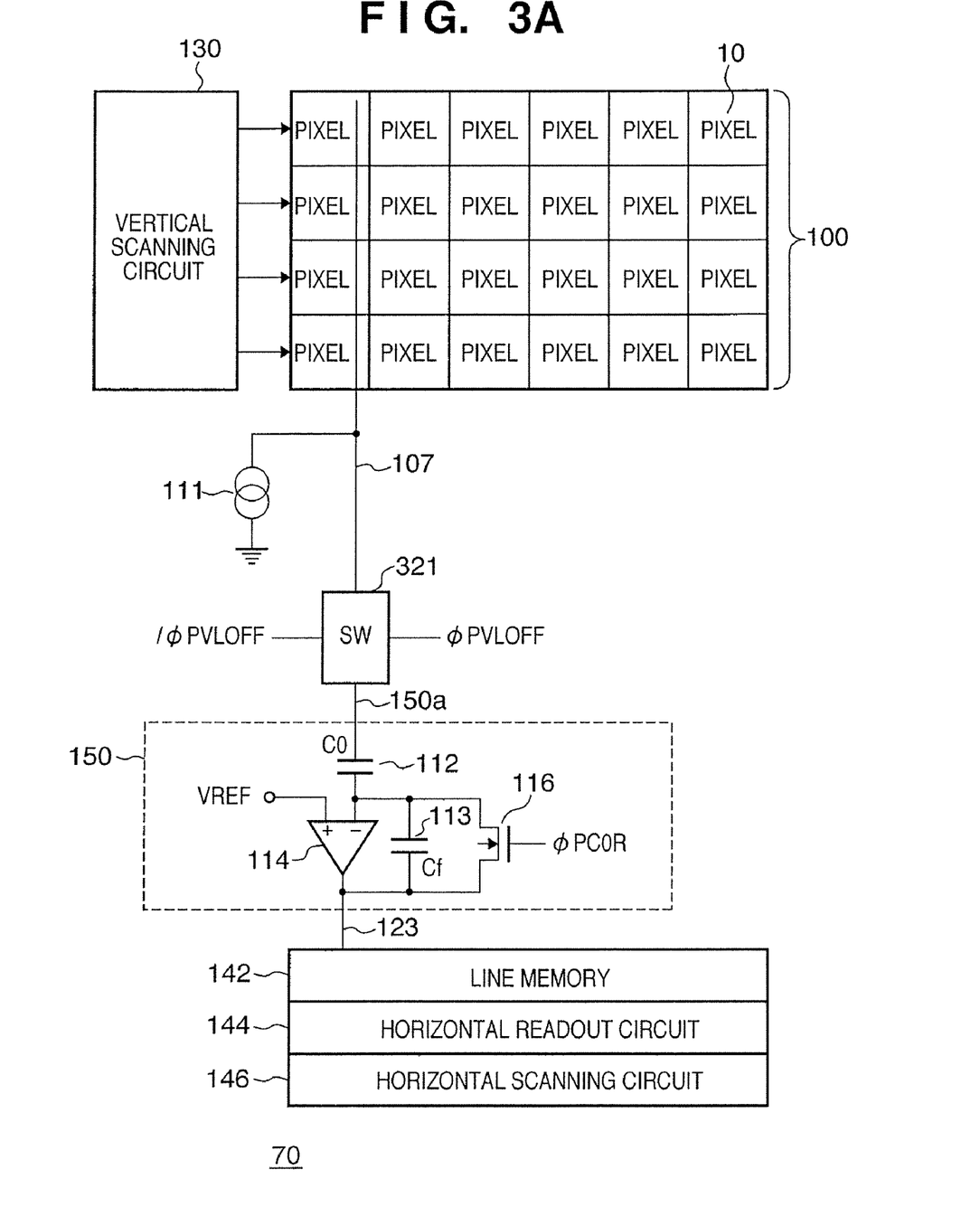
FIG. 3A is a diagram schematically showing the arrangement of a photoelectric conversion device (solid-state image sensing device) according to the third embodiment of the present invention.

FIG. 3A is a diagram schematically showing the arrangement of a photoelectric conversion device (solid-state image sensing device) according to the third embodiment of the present invention. Details which are not particularly referred to here can follow the first embodiment.

Figure 3B:
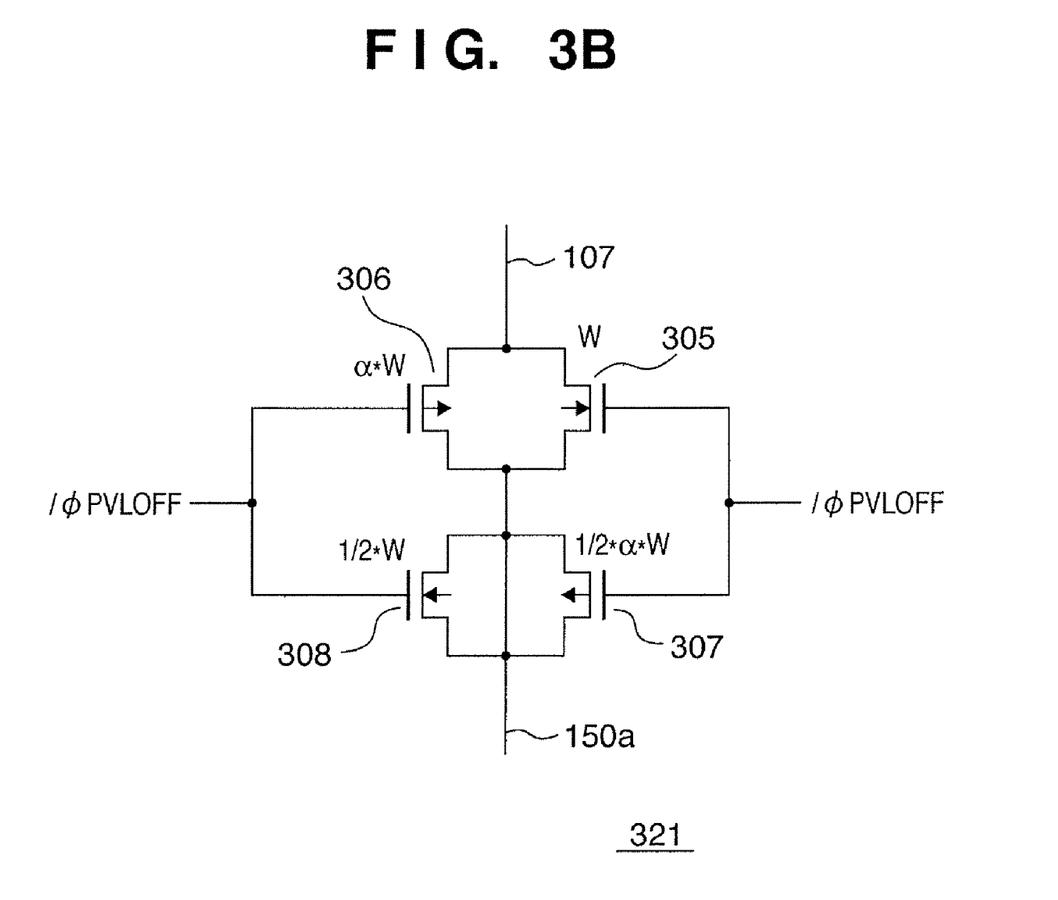
FIG. 3B is a circuit diagram showing the arrangement of a photoelectric conversion device (solid-state image sensing device) according to the third embodiment of the present invention.

A photoelectric conversion device 70 according to this embodiment has the arrangement in which an isolation switch 121 in the first embodiment is replaced with an isolation switch 321. FIG. 3B is a circuit diagram showing the arrangement of the isolation switch 321. In this embodiment, the difference between the ON resistances of an NMOS transistor and a PMOS transistor is considered. Generally, the ON resistance of the PMOS transistor is two to three times that of the NMOS transistor. When using these transistors for a transmission switch, the PMOS transistor advantageously transmits a high potential, and the NMOS transistor advantageously transmits a low potential. Hence, when the NMOS and PMOS transistors have the same size as in the second embodiment, nonlinearity may appear such that the switch has a high ON resistance and a large delay in a high-potential region, and it has a low ON resistance and a small delay in a low-potential region. In the second embodiment, both of the potential of a vertical signal line 107 and the potential of an input node 150a of an amplifier 150 can be low, and the photoelectric conversion device can operate in the region in which the ON resistance of an NMOS transistor 221n is low (the region with high linearity). However, for example, when a power supply voltage (VCC in FIG. 6) increases, a pixel 10, the vertical signal line 107, and the input node 150a of the amplifier 150 may operate in a high-potential region.

Accordingly, this embodiment supplies the isolation switch 321 exemplified by FIG. 3B. The isolation switch 321 includes main switches 305 and 306 and dummy switches 307 and 308. The isolation switch 321 includes a parallel circuit of the main switches 305 and 306 connected between the vertical signal line 107 and the input node 150a of the amplifier 150, and the dummy switches 307 and 308 whose source and drain connect to the input node 150a. The main switch 305 and the dummy switch 308 comprise NMOS transistors, and the main switch 306 and the dummy switch 307 comprise PMOS transistors.

The main switches 305 and 306 provide the ON/OFF function of the isolation switch 321. The sizes of the NMOS transistor 305 and the PMOS transistor 306 are determined such that the ON resistance of the NMOS transistor 305 is the same as that of the PMOS transistor 306. Referring to FIG. 3B, W represents the gate width, and α represents the ratio determined in design. Generally, α can be two to three.

The magnitudes of the parasitic capacitances of the main switches 305 and 306 are different from each other. However, the dummy switches 307 and 308 cancel the difference. That is, the sum of the parasitic capacitance of the main switch 305 (the parasitic capacitance between the gate and one diffusion region) and the parasitic capacitance of the dummy switch 307 (the parasitic capacitance between the gate and two diffusion regions) is the same as the sum of the parasitic capacitances of the main switch 306 and the dummy switch 308.

In order to prevent the pseudo signal caused by transition of an isolation signal φPVLOFF and an inverted isolation signal /φPVLOFF from being transmitted to the input node of the amplifier 150, the dummy switch 307/308 side of the isolation switch 321 connects to the input node 150a.

The effect of this embodiment is very large as shown in FIG. 2B according to the second embodiment, and there is almost no potential fluctuation of the node 150a by capacitive coupling between the isolation signal φPVLOFF and the inverted isolation signal /φPVLOFF. Hence, the readout time can be shorter than that in the first embodiment.

Fourth Embodiment

Figure 4:
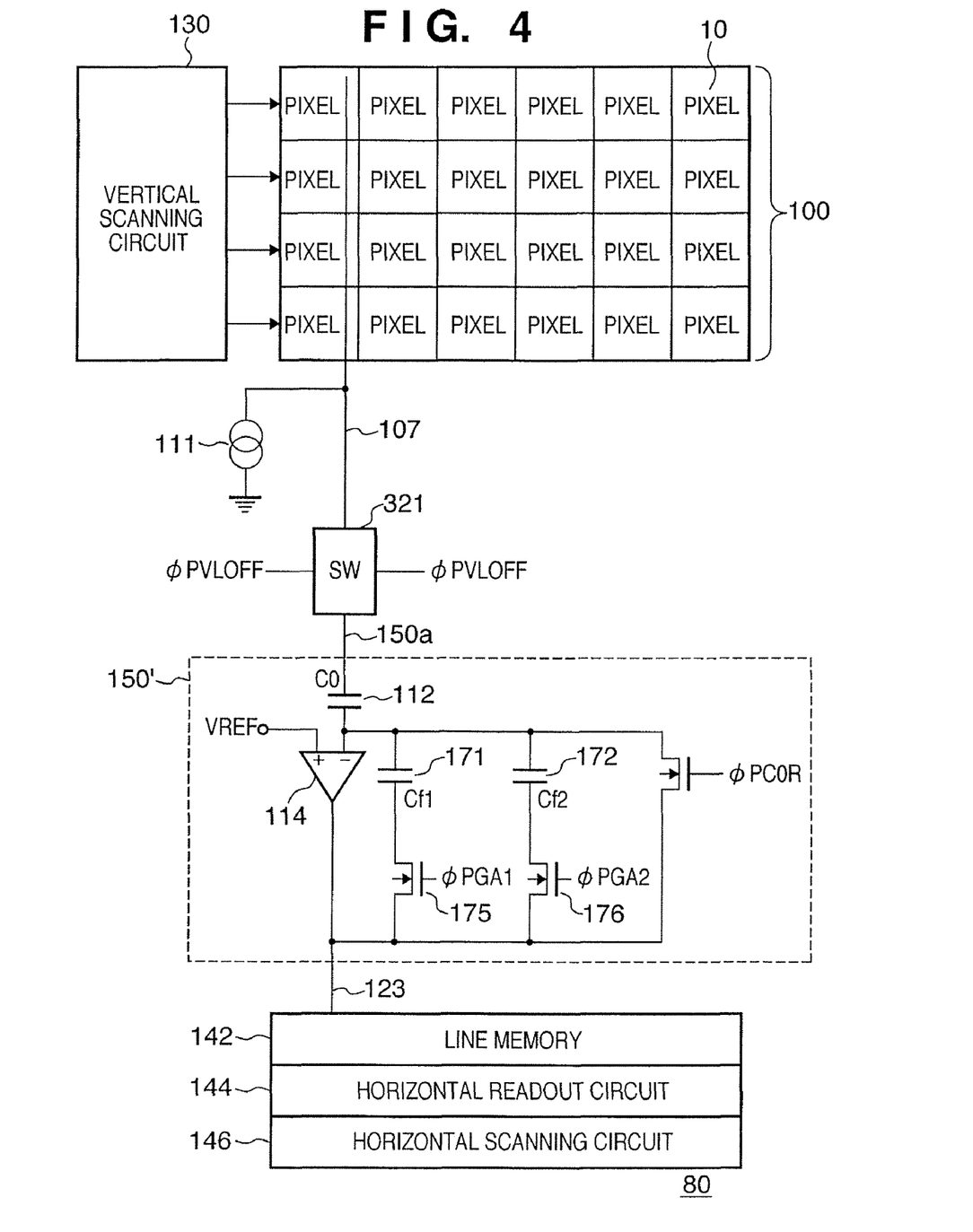
FIG. 4 is a diagram schematically showing the arrangement of a photoelectric conversion device (solid-state image sensing device) according to the fourth embodiment of the present invention.

FIG. 4 is a diagram schematically showing the arrangement of a photoelectric conversion device (solid-state image sensing device) according to the fourth embodiment of the present invention. Details which are not particularly referred to here can follow the first, second, and third embodiments.

A photoelectric conversion device 80 of this embodiment has the arrangement in which an amplifier 150 in the first, second, and third embodiments is replaced with an amplifier 150'. FIG. 4 shows the arrangement in which the amplifier 150 in the third embodiment is replaced with the amplifier 150' for the sake of convenience.

The photoelectric conversion device 80 in this embodiment can change the value of a feedback capacitance in order to change the gain of the amplifier 150' depending on the photographing scene. The feedback capacitance for deciding the gain of the amplifier 150' is decided in accordance with the ON/OFF states of the switches 175 and 176 which respectively connect a feedback capacitance (Cf1) 171 and a feedback capacitance (Cf2) 172 in parallel between the first input terminal and output terminal of a differential amplifier 114. The ON/OFF states of the switches 175 and 176 are controlled in accordance with the logic levels of gain control signals φPGA1 and φPGA2. For example, when photographing in bright outdoor in the daytime, φPGA1=φPGA2=high. In this case, the gain of the amplifier 150' is set to CO/(Cf1+Cf2), that is, low sensitivity. On the other hand, when photographing in dark indoors, high sensitivity is required. In this case, φPGA1=high, and φPGA2=low. The gain of the amplifier 150' is CO/Cf1. Generally, as the gain increases, the response speed decreases in the amplifier (AMP), in accordance with the law of constant GB product. Particularly when the sensitivity setting is high, that is, when the gain of the amplifier increases, the output from the amplifier may largely fluctuate because of the pseudo signal. Hence, particularly when the sensitivity setting is high, it takes a long time before the output returns to the normal state (stable point). However, even the photoelectric conversion device which can set high sensitivity can shorten the readout time by inserting a switch 321 between a vertical signal line 107 and the amplifier 150', and turning off the switch 321 when a transfer pulse φTX is enabled.

Fifth Embodiment

In the first to fourth embodiments, a clamp-type amplifier is used. However, it is possible to effectively shorten a readout time by inserting a switch between a vertical signal line and an amplifier of another type in order to disconnect them. For example, when a signal (φPCOR) to be supplied to the gate of a reset switch 116 is always set low or when the reset switch 116 is deleted, the difference between a signal to be input to a capacitor 112 and a reference voltage VREF is multiplied by CO/Cf, and then read out. Accordingly, a pseudo signal caused by transition of a transfer pulse must not be input to the amplifier regardless of the type of amplifier.

Application Example

Figure 10:
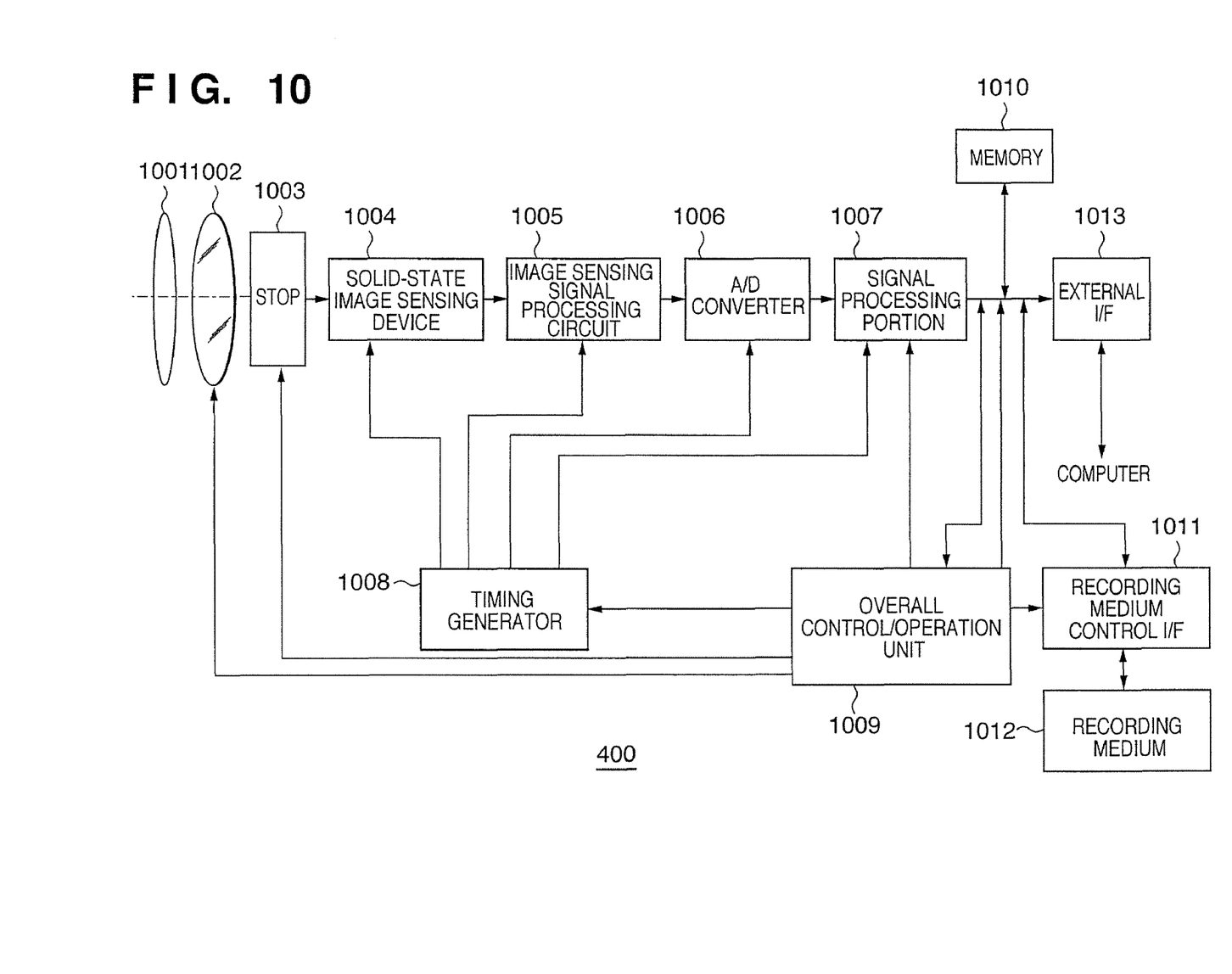
FIG. 10 is a block diagram schematically showing the arrangement of an imaging device according to preferred embodiments of the present invention.

FIG. 10 is a block diagram schematically showing the arrangement of an imaging device according to preferred embodiments of the present invention. An imaging device 400 comprises a solid-state image sensing device 1004 exemplifying the photoelectric conversion device according to the first to fifth embodiments.

A lens 1002 forms an optical image of an object on the imaging plane of the solid-state image sensing device 1004. The outer surface of the lens 1002 is covered with a barrier 1001 which protects the lens 1002 and also serves as a main switch. The lens 1002 has a stop 1003 to adjust the quantity of light passing through the lens 1002. An image sensing signal processing circuit 1005 performs various processes such as correction and clamping for image sensing signals output from the solid-state image sensing device 1004 through a plurality of channels. An A/D converter 1006 analog-to-digital-converts image sensing signals output from the image sensing signal processing circuit 1005 through a plurality of channels. A signal processor 1007 performs various processes such as correction and data compression for image data output from the A/D converter 1006. The solid-state image sensing device 1004, image sensing signal processing circuit 1005, A/D converter 1006, and signal processor 1007 operate in accordance with timing signals generated by a timing generator 1008.

The blocks 1005 to 1008 may be formed on the same chip as that of the solid-state image sensing device 1004. An overall control/operation unit 1009 controls the blocks of the imaging device 400. The imaging device 400 comprises a memory 1010 for temporarily storing image data, and a recording medium control interface 1011 for recording/reading out an image on/from a recording medium. A recording medium 1012 includes a semiconductor memory and the like and is detachable. The imaging device 400 may comprise an external interface (I/F) 1013 for communicating with an external computer or the like.

The operation of the imaging device 400 shown in FIG. 10 will be described. In response to opening of the barrier 1001, the main power supply, the power supply of the control system, and the power supply of the imaging circuit including the A/D converter 1006 are sequentially turned on. To control the exposure, the overall control/operation unit 1009 sets the stop 1003 to the full-aperture state. A signal output from the solid-state image sensing device 1004 enters the A/D converter 1006 through the image sensing signal processing circuit 1005. The A/D converter 1006 A/D-converts the signal and outputs it to the signal processor 1007. The signal processor 1007 processes the data and supplies it to the overall control/operation unit 1009. The overall control/operation unit 1009 calculates and determines the exposure. The overall control/operation unit 1009 controls the stop based on the determined exposure.

The overall control/operation unit 1009 extracts a high-frequency component from the signal which is output from the solid-state image sensing device 1004 and processed by the signal processor 1007, and calculates the distance to the object based on the high-frequency component. The overall control/operation unit 1009 drives the lens 1002 to determine whether the object is in focus. If the overall control/operation unit 1009 determines that the object is out of focus, it drives the lens 1002 again to measure the distance.

After confirming that the object is in focus, actual exposure starts. After the end of exposure, an image sensing signal output from the solid-state image sensing device 1004 undergoes correction and the like by the image sensing signal processing circuit 1005, is A/D-converted by the A/D converter 1006, and is processed by the signal processor 1007. The image data processed by the signal processor 1007 is stored in the memory 1010 by the overall control/operation unit 1009.

The image data stored in the memory 1010 is recorded on the recording medium 1012 via the recording medium control I/F under the control of the overall control/operation unit 1009. The image data can be provided to a computer or the like via the external I/F 1013 and processed by it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-243395, filed Sep. 7, 2006, which is hereby incorporated by reference herein in its entirety.

What is claimed is:

1. A photoelectric conversion device including a pixel array in which a plurality of pixels are arrayed to form rows and columns, wherein pixels in a selected row respectively output signals to vertical signal lines, and amplifiers configured to amplify the signals supplied via the vertical signal lines, the device comprising:
   isolation switches inserted between the vertical signal lines and input nodes of the amplifiers; and
   a horizontal readout circuit configured to sequentially read out signals amplified by the amplifiers,
   wherein each pixel includes a photodiode, a floating diffusion, a transfer switch, which transfers a charge of the photodiode to the floating diffusion, and an amplification transistor, which outputs a signal to the vertical signal line in accordance with a potential of the floating diffusion,
   wherein each amplifier includes a differential amplifier, a clamp capacitor arranged between the isolation switch and an input terminal of the differential amplifier, and a reset switch interposed between the input terminal and an output terminal of the differential amplifier, and
   wherein the isolation switches are kept in a turned-off state at least in a period when a transfer pulse for controlling the transfer switches transits and the reset switch is turned off before the transition of the transfer pulse.

2. The device according to claim 1, wherein each isolation switch includes an NMOS transistor.

3. The device according to claim 1, wherein each isolation switch includes an NMOS transistor and a PMOS transistor, which are connected in parallel and are driven by signals having opposite logic levels such that the NMOS transistor and the PMOS transistor are turned off at least in the period when the transfer pulse for controlling the transfer switch transits.

4. The device according to claim 3, wherein one diffusion region of the NMOS transistor is connected to one diffusion region of the PMOS transistor, and another diffusion region of the NMOS transistor is connected to another diffusion region of the PMOS transistor.

5. The device according to claim 3, wherein the NMOS transistor and the PMOS transistor have a same size.

6. The device according to claim 1, wherein the isolation switches include
   a first NMOS transistor connected between the signal line and the input node of the amplifier,
   a first PMOS transistor connected between the signal line and the input node of the amplifier, and
   a second NMOS transistor and a second PMOS transistor respectively having a source and a drain connected to the input node of the amplifier,
   the first NMOS transistor and the second PMOS transistor are driven by an isolation signal, and
   the first PMOS transistor and the second NMOS transistor are driven by an inverted isolation signal serving as an inverted signal of the isolation signal.

7. The device according to claim 6, wherein an ON resistance of the first NMOS transistor is equal to an ON resistance of the first PMOS transistor.

8. The device according to claim 7, wherein a parasitic capacitance between a node to which the isolation signal is supplied and the input node is equal to a parasitic capacitance between a node to which the inverted isolation signal is supplied and the input node.

9. The device according to claim 1, wherein a gain of each of the amplifiers is variable.

10. A photoelectric conversion device according to claim 1 wherein the photoelectric conversion device is incorporated in an imaging device that includes a processing circuit, which processes a signal supplied from the photoelectric conversion device.

* * * * *